Jan. 19, 1965
P. H. SCHRADER
3,166,222
VIBRATORY BIN AGITATOR
Filed Aug. 11, 1961
3 Sheets-Sheet 1
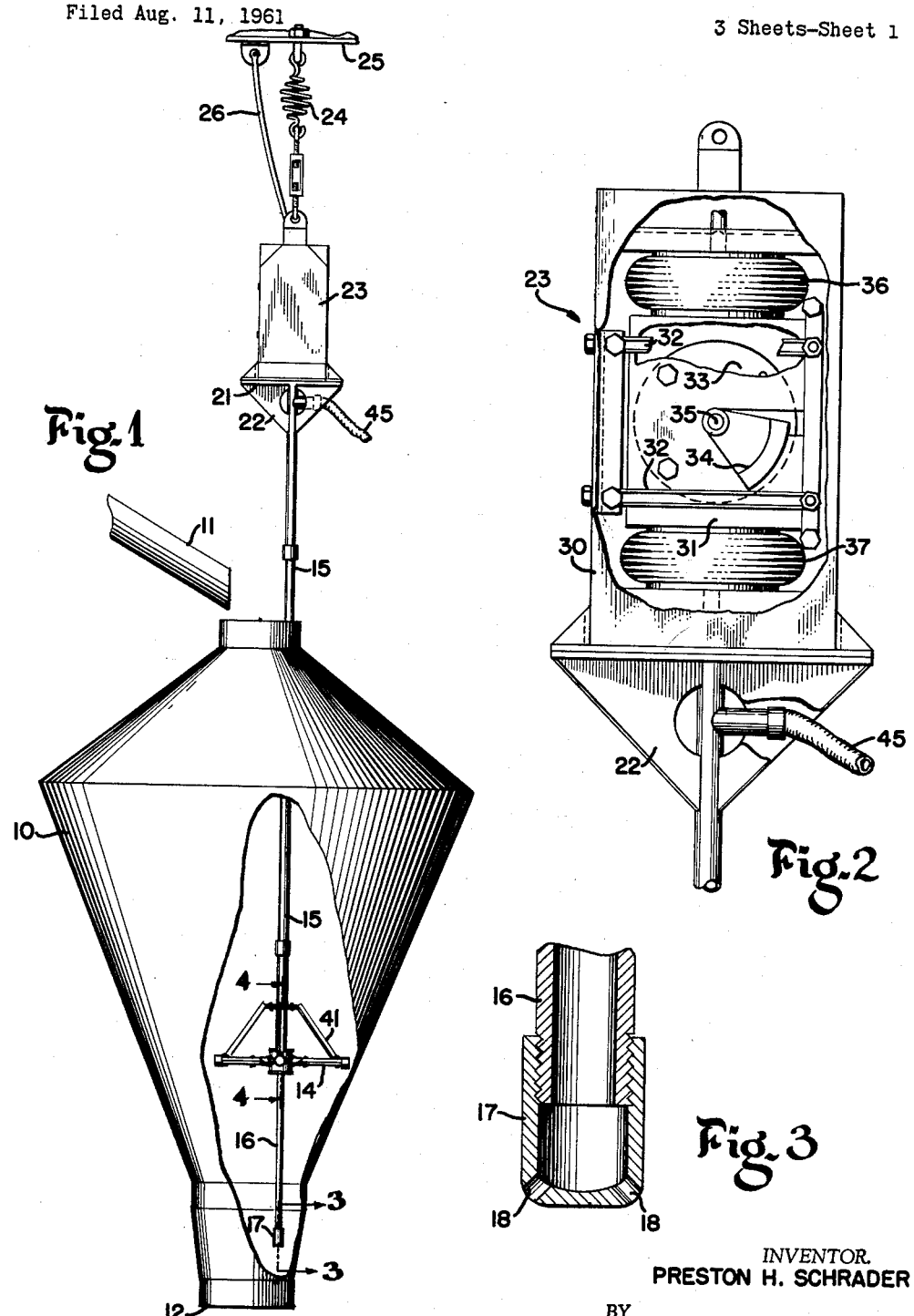
INVENTOR.
PRESTON H. SCHRADER
BY Marshall, Wilson & Click
ATTORNEYS Jan. 19, 1965 P. H. SCHRADER 3,166,222
VIBRATORY BIN AGITATOR
Filed Aug. 11, 1961 3 Sheets-Sheet 2

INVENTOR.
PRESTON H. SCHRADER
BY
ATTORNEYS

Jan. 19, 1965  P. H. SCHRADER  3,166,222
VIBRATORY BIN AGITATOR
Filed Aug. 11, 1961  3 Sheets-Sheet 3

INVENTOR.
PRESTON H. SCHRADER
BY
*Marshall, Wilson & Click*
ATTORNEYS

United States Patent Office 3,166,222
Patented Jan. 19, 1965

3,166,222
VIBRATORY BIN AGITATOR
Preston H. Schrader, Louisville, Ky., assignor to Rex Chainbelt Inc., a corporation of Wisconsin
Filed Aug. 11, 1961, Ser. No. 130,892
9 Claims. (Cl. 222—195)

This invention relates to vibratory bin agitators and in particular to be an improved agitator that can be easily adapted for use in various types of storage bins to promote the free uniform flowing of powdery material from such bins.

Many powdery materials when stored in funnel shaped hoppers tend to arch or bridge and thus refuse to flow evenly when the bottom of the hopper is opened. It is also characteristic of these materials that when the arch is broken the material tends to fall so freely that it flushes out and thus feeds a surge of material into the receiving system.

The principal object of this invention is to provide a simple economical apparatus for promting the free uniform flow of powdery material from various shaped hoppers or drums.

Another object of the invention is to provide a simple apparatus for evenly distributing an aeriform fluid into the lower portions of a hopper filled with powdery material and mechanically agitating the material to promote the free flow of the material as it is drawn from the bottom of the hopper.

More specific objects and advantages are apparent from the following description of a preferred form of the invention.

According to the invention a skeleton frame extending across a substantial portion of a cross section of the hopper is connected through a stem to a vibrating mechanism adapted to produce either a vertical or rotary or combined vibration of the frame and thus inhibit the formation of arches in the powdery material. At the same time an aeriform fluid may be supplied through the stem to the frame for discharge into the material to further inhibit any tendencies for the material to arch.

A preferred embodiment of the invention is illustrated in the accompanying drawings.

In the drawings:

FIG. 1 is a side elevation of a bin agitator installed in a bin with parts broken away to reveal the structure.

FIG. 2 is an enlarged vertical section of a vibration exciter suitable for use with the agitator.

FIG. 3 is a vertical section of the lower end of the agitator showing the air passages therethrough.

Figure 5:
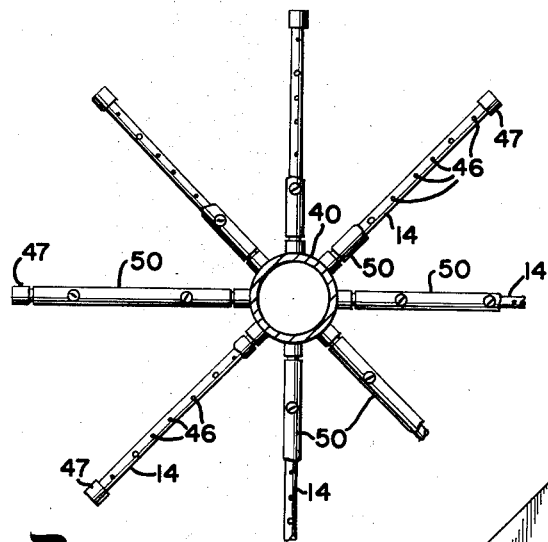
FIG. 5 is a fragmentary plan view with parts broken away of the agitator shown in FIG. 4.

These specific figures and the accompanying description are intended merely to illustrate the invention and not to impose limitations on its scope.

In the apparatus as shown in FIG. 1 a funnel shaped container 10 is adapted to temporarily store material that is fed in through a chute 11 and withdrawn through a restricted bottom portion 12 of the container. Suitable valving mechanism may be included in the lower portion of the container 10 to control the rate of flow of material. To prevent arching of the material and to promote uniform flow of materials from the side portions and central portions of the hopper 10, an agitator 13, which preferably comprises a plurality of radially extending tubular arms 14, is mounted on the lower end of a stem 15. The agitator 13 also includes a downwardly directed stem 16 the lower end of which is fitted with a perforated cap 17. The perforations through the cap, as shown in detail in FIG. 3, provide a plurality of air passages 18 through which an aeriform fluid may be discharged from the interior of the agitator 13 into the powdery material at the bottom of the hopper 10.

The agitator 13 is preferably carried on the lower end of the tubular stem 15 the upper end of which is rigidly attached to a small platform 21 by means of a plurality of gusset plates 22. A vibration generator 23, shown in detail in FIG. 2, is suspended by means of a vibration isolating spring 24 from an overhead structure 25. A safety chain 26 may also be employed to catch the vibration generator in the event of failure of the isolating spring 24. The chain 26 may also serve as a guide for electrical power and control leads leading to the vibration generator 23.

As may be seen in FIG. 2 the vibration generator 23 comprises an outer frame 30 which with the stem 15 and agitator 13 forms a work member and an exciter member 31 that is contained within the frame 30 and guided by parallel links 32 arranged to confine the exciter member 31 to a substantially straight line vertical path. The exciter member 31 includes a drive motor 33 that carries eccentric weights 34 on each end of its armature shaft 35. The exciter member 31 is resiliently coupled to the outer frame 30 of the vibration generator 23 by a pair of air springs 36 and 37 that are connected through restricted air lines to a source of controlled air pressure. Since the spring rate of the air springs 36 and 37 varies linearly with the inflation pressure it is possible, by control of such inflation pressure, to vary the coupling between the exciter member 31 and the case 30 and thus the vibration of the case 30 of the vibration generator 23 in response to the vibratory force of the eccentric weights 34.

Figure 4:
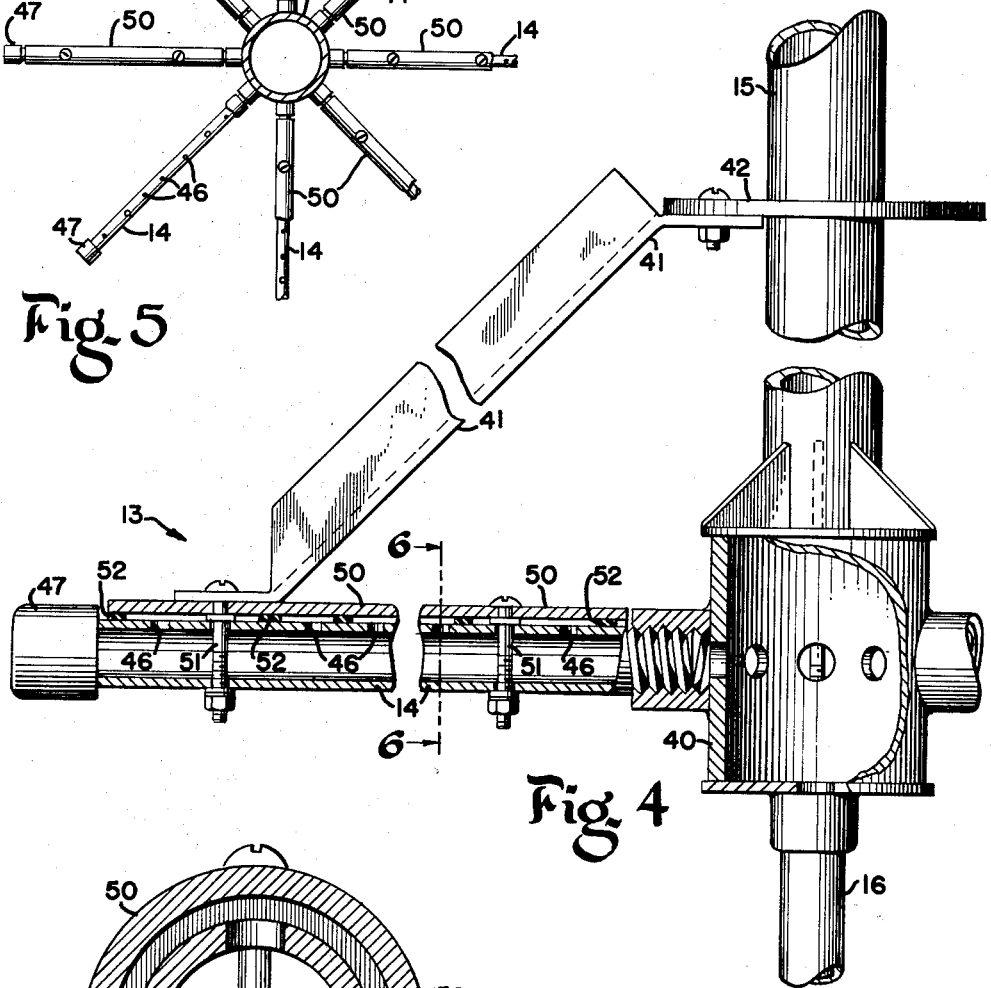
FIG. 4 is an enlarged fragmentary vertical section of the agitator.
Figure 6:
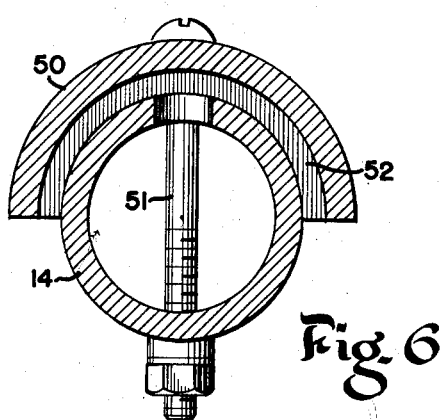
FIG. 6 is an enlarged vertical section of one of the arms of the agitator as seen from the line 6—6 of FIG. 4.
Figure 7:
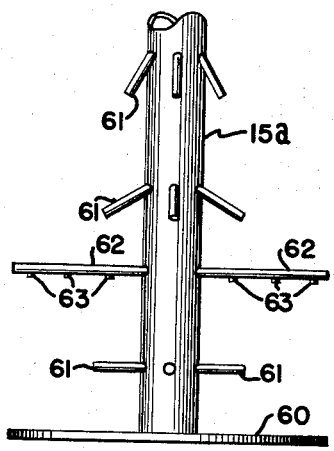
FIG. 7 is a fragmentary side elevation of a modified form of agitator and diffuser for use in agitating material in bins according to the invention.
Figure 8:
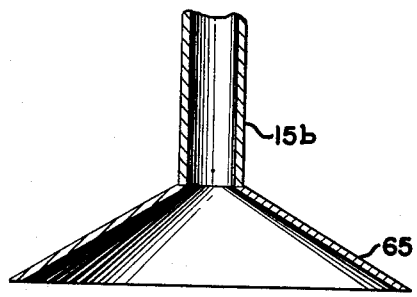
FIG. 8 is a vertical section showing another form of agitator suitable for use in conditioning powdery material in hoppers or bins.
Figure 9:
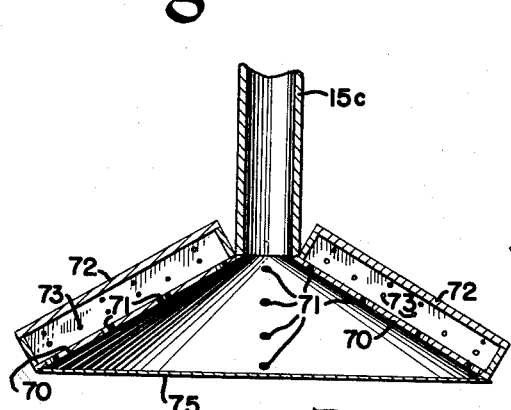
FIG. 9 is a modified form of the structure shown in FIG. 8.
Figure 10:
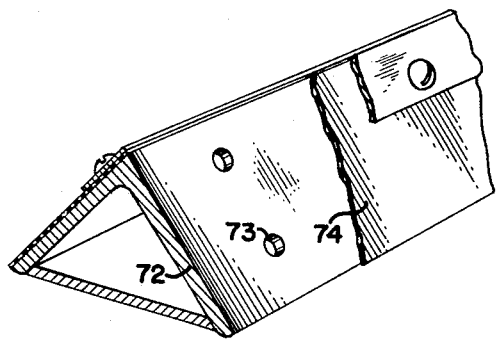
FIG. 10 is an enlarged figure showing a detail of one of the valves of the arrangement shown in FIG. 9.
Figure 11:
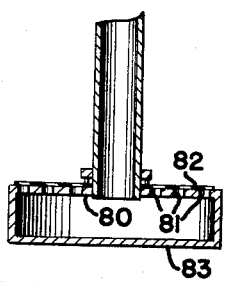
FIG. 11 is another form of agitator serving also as a valve for admitting or pumping aeriform fluid into the material being conditioned.

The agitator 13, as illustrated in detail in FIG. 4, preferably comprises tubular radially directed arms or spokes 14 that extend laterally from a central hub 40 which in turn is connected to the lower end of the stem 15. Braces 41 connected between a collar 42 on the stem 15 and the outer ends of the spokes 14 prevent any substantial bending of the spokes or strain of their threaded connections at the hub 40 in response to the vibrational forces.

Each of the spokes 14, as shown, is hollow and is connected to the interior of the housing 40 so that air or other aeriform fluid supplied through a hose connection 45 and the stem 15 may flow through the interior of the spokes 14 and out through apertures 46 provided in their upper surfaces. Each of the spokes is provided with a cap 47 to prevent leakage at its end. Alternatively the apertures 46 may be located in the lower surfaces of the spokes.

The assembly of the spokes 14 to the hub 40 constitutes a skeleton frame having an outline area substantially coextensive with the tips of the spokes.

To prevent the ingress of powdery material into the spokes 14 through the apertures 46 in their upper surfaces semi-cylindrical shells 50 are arranged in overhanging coaxial relation to the spokes 14, the semi-cylindrical shells being held by bolts 51 and being spaced from the tubular spokes 14 by rubber spacers 52 serving as seals to prevent lateral flow of the aeriform fluid along the spokes and forcing the fluid to flow downwardly around the periphery of the spokes 14 and out under the edges of the coaxial covering shells 50. The shells 50 may be omitted when the apertures 46 are located in the lower surfaces of the spokes.

The shells 50, besides directing the flow of air, also serve to increase the effective area of the spokes 14 and thus the quantity of powdery material in the container 10 that is directly influenced by the mechanical vibration of the agitator 13.

Other forms of agitators that may be supported and vibrated by the stem 15 are illustrated in FIGS. 7, 8, 9 and 11.

Referring to FIG. 7, a satisfactory agitator may include a flat mixer plate 60 attached to the bottom end of a tubular stem 15*a*. For diffusing aeriform fluid into the vibrationally agitated material a plurality of nozzles 61 projecting from the sides of the tubular stem 15*a* may be provided and these may be inclined in various directions to distribute the flow of aeriform fluid. Additionally, radially extending arms or spokes 62 having nozzles or apertures 63 in their lower surfaces may be provided to still further distribute the fluid and agitate the material.

In this arrangement, as shown in FIG. 7, the vibration of the flat mixer plate breaks up any tendency for the powdery material to arch or cake in the region above the plate and at the same time by agitating the material provides an even distribution of the air or other aeriform fluid distributed through the nozzles 61 or 63. The material is thus kept in a free flowing condition so that all components of the material may readily flow down around the edges of the plate 60 and out of the hopper in which the vibratory equipment is used.

In the arrangement as shown in FIG. 8, the agitator comprises an open bottom cone or pyramid 65 connected to the bottom end of a tubular stem 15*b*. In this simple arrangement the vertical vibration of the stem 15*b* agitates the powdery material over the surface of the cone or pyramid and by keeping the material, particularly around the outer edges of the cone or pyramid in a state of agitation, allows any air or other fluid supplied through the tubular stem 15 to escape around the edges of the cone and be evenly distributed throughout the material above the surface of the cone. In fact, the vibration of the cone combined with the slope of its upper surface provides a space into which the air may readily flow, particularly during the downward portions of the vibratory cycle, to evenly aerate the material and inhibit any tendency of the material to arch in the hopper and refuse to flow evenly.

If desired, the slant surface of the cone or pyramid 65 may be perforated either in its marginal area or throughout the whole area so as to act as a diffuser admitting the air into the spaces immediately above the conical surface without requiring the air to flow around the lower edge. This latter form is preferable when the projected area of the cone or pyramid represents a substantial portion of the area of the hopper in which the equipment is installed.

This particular form is quite efficient in breaking up any incipient arches of material in the hopper because not only does it provide a vibrational force to mechanically agitate the material but it also provides a pumping action for pumping air through the adjacent material both above and below the cone. This pulsating air flow through the powdery material produces sufficient random motion of the particles of material to prevent any static settling or steep angles of repose tending to adversely affect the flowability of the material.

FIGS. 9, 10 and 11 illustrate additional modifications to augment the pumping action of the agitator. In the arrangement shown in FIG. 9, a conical or pyramid surface 70 attached to the lower end of a hollow vibratory stem 15*c* has apertures 71 that are covered by angle deflectors 72 which are illustrated in detail in FIG. 10. Each of the deflectors 72 may conveniently be formed of a piece of angle iron that is welded or otherwise attached to the conical surface 70 and which in turn is provided with apertures 73 in its side walls to provide for the escape of air from the space beneath the deflector. The apertures 73 are covered with resilient flaps 74 so as to be closed during the upward motion of the conical surface 70 in response to the vibration and to open during downward acceleration to allow air to escape from beneath the resilient flap and into the material. Since the flap "recloses" the aperture 73 at the start of the next upward cycle the net effect is a pumping action tending to induce air or other aeriform fluid from the stem 15*c* into the material above the conical surface. In this arrangement the bottom of the conical agitator may be closed with a bottom plate 75 so that all of the air admitted through the stem must flow out through the apertures 71 and 73 and under the flap 74 during the vibratory cycle.

The system may also be operated in a manner similar to the operation of the agitator shown in FIG. 8 by leaving the bottom of the conical agitator open, i.e. without the plate 75, in which case some of the air is exhausted through the open bottom directly into the material while the remainder of the admitted air is pumped out through the apertures 71, 73. This arrangement is particularly efficient when the conical surface 70 is of substantial area, and offers improved characteristics over the perforated cone 65 of FIG. 8 because the flaps 74 provide a valving action to prevent the reverse flow of air through the apertures. Thus the agitator can act as a pump in promoting a undirectional flow of air in addition to the vibratory motion.

The agitator may be modified still further, as shown in FIG. 11, by providing a hollow vibratory generally flat plate 80 having apertures 81 covered by an annular elastomer flap 82 which may be entirely in one piece or in annular rings as may be desired and which serves as a valve to allow the air to flow during the downward vibratory motion and close the apertures during the upward motion. The closed bottom of the plate 83 of the agitator acts as a ram or piston to provide vibratory force driving the material downwardly below the agitator as well as providing pulsating air motion through the material to break up any tendency to arch in the space directly below the agitator.

While it has been common practice to apply agitators or vibrators to the walls of funnel shaped bins to promote the flow of material and while it has also been known to supply aeriform fluid under pressure through the lower portions of such walls to provide fluidization of the material such systems have in general required large amounts of air under pressure or relatively large mechanical elements to provide sufficient vibratory force to break up the arching of materials.

These methods are not entirely satisfactory because some materials when subjected to vibration of the container walls tend to pack more solidly than they otherwise would. In these cases the vibration actually aggravates the problem rather than curing it. In the improved form as illustrated in the drawings the vibration is applied only to the relatively small members comprising the agitator frame or skeleton frame and, optionally, at the same time a small amount of air may be added to promote the flow of the material. The agitation produced by the vibration of the agitator 13 breaks up any tendency of the powdery material to arch in the region of the frame thus permitting an even distribution of the aeriform fluid if used.

This system offers other advantages, particularly when the material being handled comprises both a powdery material and large particles or small chunks or pellets.

When such a material is poured into a storage hopper it tends to pile up in a cone under the inlet spout. The fine material concentrates along the axis of the cone while the pellets roll down the sides of the cone and are then held against the edge by the pressure of the fine particles. The combination of the vibration and a small air flow produces a uniform flow of particles of all sizes whereas air alone rising through the bed of powdery material tends to fluidize and lift the powdery material while the heavier solid pellets readily drop through the fluidized bed so as to be the first material to be extracted when material is taken from the hopper. Conversely, when no fluidization is employed the large particles and pellets of material supplied through the chute 11 tend to roll to the side of the container as the cone of material forms in the hopper. The fine materials under this condition tend to concentrate near the axis of the container directly under the spout 11 and are the first to be withdrawn. With vibration of the container walls the large particles of material tend to flow rapidly along the side of the wall thus holding the fine materials more or less suspended in the center of the hopper.

Vibratory agitators introduced into the container, as illustrated in the drawings, allow control of these factors in that the vibration and small amounts of air applied to the central portion of the hopper promote the flow of the finer materials as rapidly as the coarser materials thereby maintaining the proportions of such material relatively unchanged.

This improved vibratory structure also permits the use of a conditioning gas such as dry hot air for drying the powdery material as well as the use of cold air in the event materials must be cooled or partially refrigerated.

In ordinary operation in containers several feet in diameter and six to ten feet high or more a vibration amplitude of 3/8 of an inch at 850 to 900 cycles per minute in a vertical direction provides very satisfactory agitation and also keeps the powdery material adjacent the agitator sufficiently free to provide uniform distribution of any air or other gas admitted through the arms.

Various modifications in the details of construction may readily be made without departing from the spirit and scope of the invention.

Having described the invention, I claim:

1. In an apparatus for handling a finely divided material confined in a fixed container, in combination, a skeleton frame positioned in the container near the bottom thereof, the frame having an outline which is adapted to cover a substantial portion of a horizontal cross section of the fixed container, said frame including a plurality of perforated tubular members, a tubular stem connected to said frame and extending upwardly out of the container, a vibrator connected to the upper end of the stem and adapted to supply vibratory force to vibrate the frame, and means for forcing an aeriform fluid through said stem and perforated tubular members for discharge through said finely divided material.

2. In an apparatus for handling a finely divided material confined in a fixed container, in combination, a skeleton frame adapted to be immersed in the material in the container having an outline which covers a substantial horizontal area of the container, said frame including a plurality of perforated tubular members, a stem connected to said frame and extending out of the material, a vibrator connected to the exposed end of the stem and adapted to produce vibration of the frame, and means for supplying an aeriform fluid to said tubular frame members for discharge through said material.

3. In an apparatus for handling a finely divided material confined in a fixed container, in combination, a skeleton frame adapted to be immersed in the material in the container and having an outline which covers a substantial horizontal area of the container, said frame including a plurality of tubular members perforated along their upper surfaces, spaced covers attached to said tubular members to shield the perforations from the material, a stem connected to said frame and extending out of the material, a vibrator connected to the end of the stem opposite the frame to produce vibration of the frame, and means for supplying aeriform fluid to said tubular members for discharge through the material in the container.

4. In an apparatus for handling a finely divided material confined in a fixed container, in combination, a skeleton frame comprising a plurality of radially extending perforated tubular members the outline of which covers a substantial area of the container adapted to be immersed in the material, a stem attached to the frame, a vibrator attached to the end of the stem opposite the frame adapted to produce vibration of said frame, and means for supplying aeriform fluid to said perforated members for discharge through said material.

5. An apparatus according to claim 4 in which the aeriform fluid is transmitted through the stem connecting the vibrator to the frame.

6. In an apparatus according to claim 4 having covers spaced from and attached to the radially extending tubular members for dispersing the aeriform fluid and increasing the area of the vibrating frame.

7. In an apparatus for handling a finely divided material in a fixed container, in combination, a hollow perforated member having substantial horizontal area adapted to be immersed in the material, a hollow stem connected to the member, and a vibrator connected to the stem remote from the member and adapted to produce a vibration of said member along a path having a substantial component normal to said area, and means for supplying aeriform fluid to said member for discharge through the perforations and material thereabove.

8. In an apparatus according to claim 7, means connected to the hollow stem to force aeriform fluid into the stem for discharge through the perforations in the hollow member.

9. In an apparatus for handling a finely divided material in a fixed container, in combination, a member adapted to be immersed in the material, said member being adapted to cover a substantial horizontal area of the container, a stem connected to the member, a vibrator connected to the stem remote from the member and adapted to produce vibration of said member, and means for supplying aeriform fluid to the space beneath the upper surface of the member for discharge through the material.

References Cited in the file of this patent

UNITED STATES PATENTS

| | | |
|---|---|---|
| 1,586,374 | Martin | May 25, 1926 |
| 2,174,348 | Damond | Sept. 26, 1939 |
| 2,214,142 | Mall | Sept. 10, 1940 |
| 2,347,267 | Jowers | Apr. 25, 1944 |
| 2,353,346 | Logan | July 11, 1944 |
| 2,569,085 | Wood et al. | Sept. 25, 1951 |
| 2,652,175 | Davis | Sept. 15, 1953 |
| 3,056,306 | Muller | Oct. 2, 1962 |

FOREIGN PATENTS

| | | |
|---|---|---|
| 828,091 | Great Britain | Feb. 17, 1960 |